United States Patent [19]

Hanscom

[11] 4,451,707

[45] May 29, 1984

[54] RING DETECTOR AND TELEPHONE LINE MONITORING SYSTEM FOR TELEPHONE ANSWERING INSTRUMENT

[75] Inventor: Bradford E. Hanscom, Downey, Calif.

[73] Assignee: T.A.D. Avanti, Inc., Compton, Calif.

[21] Appl. No.: 517,005

[22] Filed: Jul. 25, 1983

Related U.S. Application Data

[63] Continuation-in-part of Ser. No. 381,185, May 24, 1982, abandoned.

[51] Int. Cl.³ ............................................. H04M 1/64
[52] U.S. Cl. ................................. 179/84 R; 179/6.15; 179/6.16
[58] Field of Search .......... 179/1 C, 2 C, 2 A, 2 AM, 179/1 MN, 84 R, 84 A, 84 L, 6.16, 6.15, 16 AA, 18 FA; 381/58-60

[56] References Cited

U.S. PATENT DOCUMENTS

| | | | |
|---|---|---|---|
| 3,899,644 | 8/1975 | Hunt | 179/84 R |
| 4,074,081 | 2/1978 | Hamm | 179/84 R |
| 4,117,272 | 9/1978 | Ando | 179/6.16 X |
| 4,122,305 | 10/1978 | Fish et al. | 179/2 A X |
| 4,184,053 | 1/1980 | Saneyoshi | 179/84 R |

Primary Examiner—A. D. Pellinen
Assistant Examiner—W. J. Brady
Attorney, Agent, or Firm—Keith D. Beecher

[57] ABSTRACT

A circuit and system is provided in a telephone answering system and which monitors direct current voltage levels on the telephone line to distinguish between valid ring signals and dial pulses so that the telephone answering system will not attempt to answer when a local telephone is being dialed for an outgoing call. The circuit and system of the invention also responds to direct current voltage differentials on the telephone line, independent of the actual direct current voltage level, to cause the telephone answering system to return immediately to its automatic answer position in the event the calling party hangs up, or in the event the called party picks up, during the announcement interval (T1), or during the message recording interval (T2). This latter feature permits the telephone answering system immediately to return to its original condition in the presence of either of the two foregoing events, without wasting magnetic tape on blank messages, and without the calling party having to wait until the system goes through its entire (T1) and/or (T2) cycles in the event the called party picks up after the telephone answering instrument has answered a call.

12 Claims, 2 Drawing Figures

RING DETECTOR AND TELEPHONE LINE MONITORING SYSTEM FOR TELEPHONE ANSWERING INSTRUMENT

This application is a continuation-in-part of copending U.S. Pat. application Ser. No. 381,185 filed May 24, 1982, now abandoned.

BACKGROUND OF THE INVENTION

There are several requirements for telephone answering systems if the systems are to operate properly and efficiently. A first requirement is that the system must distinguish between an incoming ring signal and outgoing dialing pulses from the telephone to which the system is connected. This discrimination must be such that the system will answer in the presence of an actual ring signal, but will not attempt to answer in the presence of outgoing dialing pulses.

Another requirement, if the telephone answering instrument is to operate efficiently, is that it should immediately stop operating and return to its original automatic answer position should the calling party hang up before the end of the normal operational cycles of the instrument, or should the called party pick up before the end of the normal operational cycles, for the reasons set forth above.

The system of the present invention provides a simple and economical means which fulfills all the foregoing requirements. The circuit and system of the invention is of the same general type as is described in Humm U.S. Pat. No. 4,074,081 (179/84R) which issued Feb. 14, 1978. However, the system of the invention achieves the results achieved by the Humm system in a different manner and by the use of simpler circuitry.

DETAILED DESCRIPTION OF THE ILLUSTRATED EMBODIMENT

Figure 1:
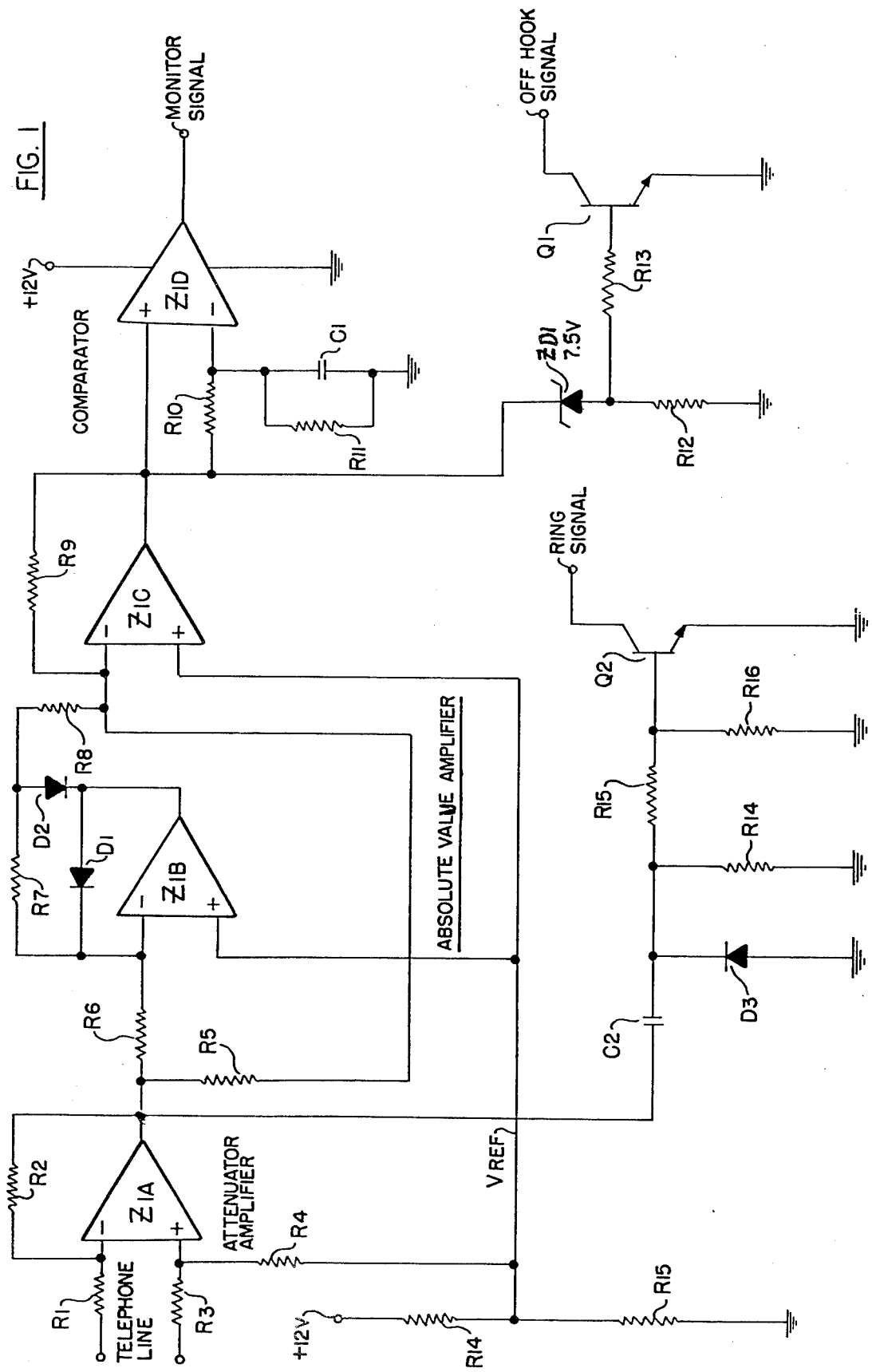
FIG. 1 is a schematic representation of one embodiment of the circuit and system of the invention.

The circuit illustrated in FIG. 1 includes a series of amplifiers Z1A, Z1B, Z1C and Z1D, which may all be contained in an integrated circuit of the type designated LM324. Amplifier Z1A is connected as an input attenuator amplifier with a gain of less than unity. For example, the gain of amplifier Z1A may be of the order of 0.025. Amplifiers Z1B and Z1C are connected as absolute value amplifiers, and may have a gain, for example, of the order of 8.2. Amplifier Z1D is connected as a comparator.

A pair of resistors R1 and R3, each of which may have a value of 22 megohms, are used to connect the inverting input terminal and non-inverting input terminal of amplifier Z1A to the telephone line. These resistors provide the high impedance coupling of the telephone answering instrument to the telephone line which is acceptable to the Federal Communications Commission in the United States, as well as to the British Post Office in the United Kingdom.

The output of amplifier Z1 is connected back to the input through a 560 kilo-ohm resistor R2, and the non-inverting input terminal is connected to a potential lead designated $V_{ref}$ through a 560 kilo-ohm resistor R4. Lead $V_{ref}$ is connected to the common junction of a pair of 1 kilo-ohm resistors R14 and R15 which are connected between the positive terminal of a 12 volt source and ground. Therefore, the lead $V_{ref}$ provides a reference voltage of 6 volts.

The amplifier Z1A is connected as an input attenuator amplifier with a gain, as stated, of 0.025. Therefore, variations in the voltage of the telephone line between, for example, ±40 volts causes the amplifier Z1A to provide an output of ±1 volt. This amplifier permits telephone line voltages up to 240 volts, for example, to be measured without distortion, and without damage to the system.

The output of amplifier Z1A is connected through a 10 kilo-ohm resistor R6 to the inverting input terminal of amplifier Z1B, and through a 10 kilo-ohm resistor R5 to the inverting input terminal of amplifier Z1C. The non-inverting input terminals of amplifiers Z1B and Z1C are connected to the voltage reference lead $V_{ref}$.

The output of amplifier Z1B is connected to a pair of diodes D1 and D2 which, together with a 10 kilo-ohmn resistor R7 are connected to the inverting input terminal of amplifier Z1B, and through a 5.1 kilo-ohm resistor R8 to the inverting input terminal of amplifier Z1C. The output of amplifier Z1C is connected back to the non-inverting input terminal through a 82 kilo-ohm resistor R9.

The amplifiers Z1B and Z1C are connected as a full-wave rectifier circuit, and function as absolute value amplifiers with a gain, for example, of 8.2. These amplifiers provide independence to the polarity of the voltage appearing on the telephone line, so that, for example, an output of ±1 volt from the amplifier Z1A would cause the amplifier circuits Z1B, Z1C to produce an output of 8.2 volts.

The output of the attenuator amplifier Z1A is also coupled through a 0.1 microfarad capacitor C2 to the base of an NPN transistor Q2 whose emitter is connected to ground. The capacitor is connected to the base through a 22 kilo-ohm resistor R15, which, in turn, is connected to a 10 kilo-ohm grounded resistor R14, and to a 47 kilo-ohm grounded resistor R16. The junction of capacitor C2 and resistor R15 is also connected to a grounded diode D3.

The circuit of transistor Q2 responds to the A.C. output of amplifier Z1A to provide a ring signal for the telephone answering instrument.

The output of amplifier Z1C is connected through a Zener diode ZD1 to a grounded 4.7 kilo-ohm resistor R12. The junction of the Zener diode and resistor R12 is connected through a 4.7 kilo-ohm resistor R13 to the base of a grounded emitter NPN transistor Q1. The collector of transistor Q1 is connected to the positive terminal of the 5 volt source through a 3 kil-ohm resistor R202. The transistor Q1 is normally conductive. However, if the voltage of the telephone line drops, for example, to less than 20 volts, the transistor Q1 becomes non-conductive, and its output voltage rises abruptly.

The line voltage of the telephone line is normally above 20 volts, for example, in the neighborhood of 50 volts, for most telephone systems. Therefore, under normal conditions, transistor Q1 is conductive. Then, should a ring signal occur, the ring signal is detected by the circuit of transistor Q2, and the ring signal from the transistor Q2 is used to activate the telephone answering system.

However, should the local telephone be in an off-hook condition, the telephone line voltage accordingly would drop to less than 20 volts, causing transistor Q1 to be non-conductive. Under such conditions, any signals on the telephone line could be dialing pulses from the local telephone, and, in any event, the telephone answering instrument should not answer, because the local telephone is off-hook. An appropriate circuit in the telephone answering system looks at the output voltage from transistor Q1 directly after the occurrence of what appears to be a ring signal on the line. This circuit permits the ring signal ouput from transistor Q2 to activate the telephone answering system, only if the voltage output from transistor Q1 is at the low value, and it prevents the telephone answering instrument from answering if the voltage output from transistor Q1 is at a high level.

Accordingly, the telephone answering instrument will answer only in the presence of a true ring signal, and it will be unresponsive to outgoing dialing pulses, which occur when the local telephone is in an off-hook condition.

The output of amplifier Z1C is also connected to the non-inverting input of comparator Z1D, and through a 4.7 kilo-ohm resistor R10 to the inverting input terminal of the comparator. The inverting input terminal is also connected to a grounded 10 microfarad capacitor C1, which is shunted by a 100 kilo-ohm resistor R11. These latter elements provide a self-biasing circuit for the comparator, so that the inverting input is biased, for example, to approximately 96% of the non-inverting input. The comparator, accordingly, responds to voltage differentials on the telephone line, and is unresponsive to absolute voltage levels.

The comparator Z1D produces an output, for example, when a voltage differential in excess of a predetermined value occurs. For example, when a genuine ring signal appears on the telephone line, the telephone answering system will answer, and this causes the voltage of the telephone line to drop, for example, to a level of the order of 10 volts.

Now, should the called party pick up during the announcement time (T1) or during the normal message recording time (T2), an additional line voltage drop to a level of the order of 6 volts will occur. Comparator Z1D will detect the 4 volt voltage differential to produce a monitor signal, which will cause the instrument immediately to "hang up", and not to complete its normal T1 and/or T2 cycles.

Likewise, should the calling party hang up after the instrument has answered, this likewise will cause a line voltage drop, and the comparator Z1D will respond to the resulting voltage differential again to produce the monitor signal.

Therefore, the system produces a monitor signal should the called party pick up during the announcement and/or message recording interval, or should the calling party hang up during the same intervals, and appropriate circuitry is provided to cause the instrument immediately to "hang up" and return to its initial state.

Figure 2:
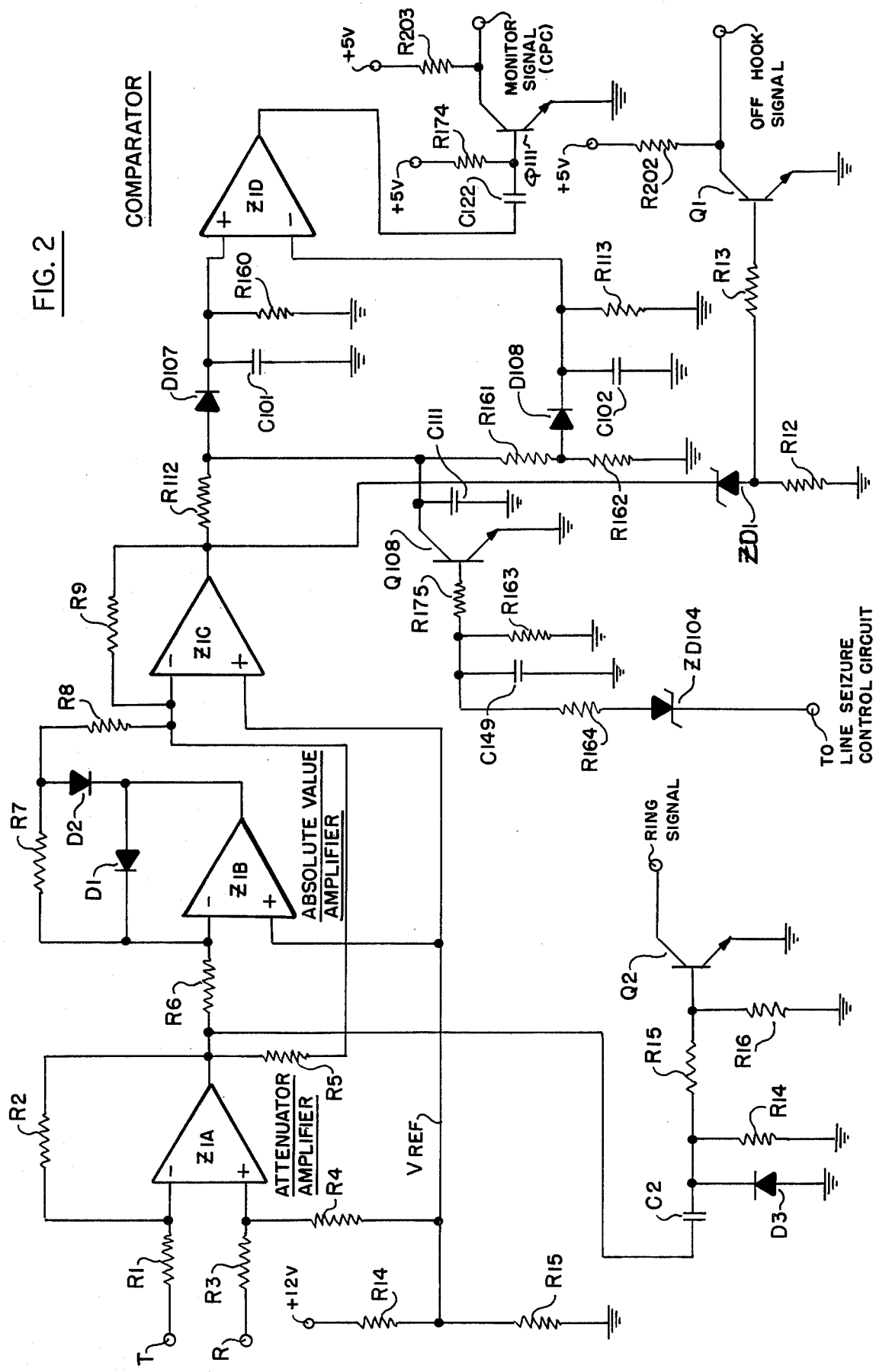
FIG. 2 is a schematic representation of a second embodiment in which the circuit and system is unresponsive to brief spurious impulses on the telephone line.

The circuit of FIG. 2 is similar in most respects to the circuit of FIG. 1, and like elements have been designated by the same numbers. However, in the circuit of FIG. 2 it is necessary for the voltage drop on the telephone line which occurs when the calling party hangs up, or when the called party picks up, to persist for a predetermined time, for example 600 milliseconds, so that the system will not respond to spurious brief impulses on the telephone line. This assures that the system will go off the line only in the presence of a true calling party hang-up or called party pick-up situation.

In FIG. 2, the output of operational amplifier Z1C is connected to the non-inverting input of operational amplifier Z1D through a 2.2 kilo-ohm resistor R112 and through a diode D107. The non-inverting input is connected to a grounded capacitor C101 of 10 microfarads, and a grounded resistor R160 of 1.2 megohms.

An NPN transistor Q108 has its collector connected to diode D107 and to a grounded 10 microfarad capacitor C111. The collector is also connected through a 2.2 kilo-ohm resistor R161 to a grounded 100 kilo-ohm resistor R162 and through a diode D108 to the inverting input of operational amplifier Z112. The inverting input is connected to a grounded 10 microfarad capacitor C102 and to a grounded 2.2 megohm resistor R113.

The output of amplifier Z1D is connected through a 1 microfarad capacitor C122 to the base of an NPN transistor Q111. The base of transistor Q111 is also connected through a 10 kil-ohm resistor R174 to the positive terminal of the 5 volt source. The emitter of transistor Q111 is grounded, and its collector is connected through a 3 kilo-ohm resistor R203 to the positive 5 volt terminal. The monitor signal appears at the output terminal conencted to the collector of transistor Q111.

A Zener diode ZD104 has its cathode connected to the line seizure control circuit of the telephone answering system, and its anode is connected through a 10 kilo-ohm resistor R164 and through a 16 kilo-ohm resistor R175 to the base of transistor Q108. The junction of resistors R164 and R175 is connected to a grounded 100 microfarad capacitor C104 and to a grounded 16 kilo-ohm resistor R163.

The cathode of Zener diode ZD104 is connected to the line seizure control circuit of the telephone answering system. Prior to line seizure the cathode of Zener diode ZD104 is established at a positive voltage by the line seizure control circuit, and the cathode is established at a near ground potential by the control circuit after a line seizure has been made. This means that so long as the telephone answering system has not responded to a telephone ring signal, transistor Q108 is conductive, establishing the junction of resistors R111 and R161 at ground potential, thereby decoupling the output of amplifier Z1C from the input circuitry of amplifier Z1D. The capacitors C101, C102 are now in a discharged state.

Under such conditions, the off-hook signal circuit of transistor Q1 is still effective, and controls the system so that it will not respond to spurious ring signals, in the manner described above. When a genuine ring signal occurs, the telephone answering system answers and its line seizure control circuit connects the system to the telephone line, establishes the cathode of Zener diode ZD104 at a near ground potential. Transistor Q108 will now be made non-conductive after the time delay caused by the discharge of capacitor C149 through resistor R163. The output of amplifier Z1C is now coupled to the input circuit of comparator Z1D, and that output, as described above, establishes a particular direct current voltage level corresponding to a telephone line voltage of the order of 10 volts.

The capacitors C101 and C102 now charge up, with capacitor C102 being charged to approximately 96% of the voltage level of capacitor C101, so that the output of comparator Z1D remains high so long as the calling party does not hang up, or so long as the called party does not pick up. Should either of these two events happen, the resulting drop in voltage in the output from amplifier Z1C causes diodes D107 and D108 to become non-conductive, and the capacitor C101 discharges through resistor R160, and capacitor C102 discharges through resistor R113. If the drop in voltage in the output of amplifier Z1C continues for at least 600 milliseconds, capacitor C101 will discharge to a point lower than capacitor C102. These voltages across capacitors C101 and C102 are compared at the inputs of comparator Z1D, and when they reach a particular differential, the comparator produces a voltage drop at its output. This voltage drop is differentiated by capacitor C122 and resistor R174, causing transistor Q111 to become non-conductive. When transistor Q111 becomes non-conductive, the control circuitry of the telephone answering system will cause the system to reset and disconnect the system from the telephone line.

It is necessary to decouple the circuit of capacitors C101, C102 from the output of amplifier Z1C until the answering system has actually answered a call and has seized the telephone line, otherwise the drop in voltage in the telephone line when line seizure occurred would be interpreted as a calling party hand-up, or a calling party pick-up, causing the system to hang up.

To sum up, when the telephone answering system answers a call, the direct current voltage on the telephone line drops, e.g., from 50 volts to approximately 10 volts. This drop is attenuated by amplifier Z1A. The approximate output of Z1A can be either plus or minus 0.25 volts from the reference which, for example, may be 6 volts.

If the output of Z1A is greater than 6 volts, the voltage is amplified by the operational amplifier Z1B and will be output to operational amplifier Z1C as a less positive voltage in diode D2 and resistor R8. This will cause Z1C to output a positive voltage of approximately 8 volts for the off-hook condition.

If the output voltage of Z1A is less than 6 volts, it is fed to Z1C through resistor R5 which, likewise, will cause the output Z1C to reach +8 volts for the off-hook condition.

The +8 volts outputed by Z1C because of the off-hook condition is fed to capacitor C101 through resistor R112 and diode D107, and is fed to the capacitor C102 through resistors R112, R161 and diode D108. This voltage output will not be passed through Zener diode ZD1, thus rendering Q1 non-conductive indicating the "off-hook" condition. Capacitor C102 now charges to approximately 96% of the voltage across capacitor C101. Since the plus input of the comparator Z1D is more positive than the minus input, the output of Z1D will be approximately +12 volts.

Now should a telephone connected to the same line be taken off hook, or should the caller hang up, a voltage drop occurs on the telephone line. This drop affects Z1C by driving its output less positive. If the drop is of at least 600 milli-seconds in duration, C101 will discharge to a point lower than C102. The voltage across the capacitors are compared by Z1D and will cause a voltage drop at its output. This voltage drop is differentiated by C122 and R174 causing Q111 to become non-conductive. When Q111 becomes non-conductive the system is caused to be disconnected from the telephone line and to be reset.

As mentioned above, the input circuit of Z1D becomes effective only after the telephone answering system has seized the telephone line, so that it responds to drops in voltage on the telephone line resulting from the calling party hang-up or caled party pick-up, so as to avoid Z1D responding to any other condition which could produce voltage drops in the telephone line.

The invention provides, therefore, an improved and simplified circuit and system which serves to distinguish between ring signals and dial pulses on the telephone line, and which also is effective to detect a caling party hang-up or called party pick-up situation.

It will be appreciated that while a particular embodiment of the system of the invention has been shown and described, modifications may be made. It is intended in the following claims to cover all modifications which appear within the true spirit and scope of the invention.

What is claimed is:

1. A monitoring system to be connected to a telephone line to control the operation of a telephone answering system, said telephone answering system being activated by ring signals received over the telephone line, and said monitoring system responding to the direct current voltage level of the telephone line, said monitoring system including in combination: an input attenuator amplifier circuit having a gain of less than unity for producing an output voltage which is a fraction of the line voltage of the telephone line; means connecting said input attenuator amplifier circuit to the telephone line; an absolute value amplifier circuit having a gain greater than unity connected to the output of said attenuator amplifier circuit for producing a single polarity output in response to outputs from said attenuator amplifier of positive or negative polarity; and an output circuit connected to the output of said absolute value amplifier for providing an output signal when the telephone line voltage drops below a particular value to prevent the telephone answering system from responding to spurious ring signals received over the telephone line during the continuance of said output signal.

2. The combination defined in claim 1, in which said attenuator amplifier circuit has a gain of the order of 0.025.

3. The combination defined in claim 1, in which said absolute value amplifier has a gain of the order of 8.2.

4. The combination defined in claim 1, in which said connecting means includes high impedance elements directly connecting the monitoring system to the telephone line.

5. The combination defined in claim 1, in which said output circuit includes a normally conductive transistor which becomes non-conductive when the direct current telephone line voltage drops below a predetermined level.

6. The combination defined in claim 1, in which direct current voltage differentials occur on the telephone line independent of the actual direct current level of the telephone line when a calling party hangs up and when a called party picks up, and which includes a second output circuit which responds to said direct current voltage differentials on the telephone line after the telephone answering system has been activated by a ring signal received over the telephone line to produce a second output signal when such voltage differentials exceed a predetermined minimum value to cause the telephone answering system to return to its original condition prior to the reception of the ring signal.

7. The combination defined in claim 1, in which said output circuit includes a comparator having an inverting input terminal and a non-inverting input terminal, said non-inverting input terminal being connected to the output of said absolute value amplifier circuit, and self-biasing circuitry connected to the inverting input terminal to bias the inverting input terminal to a predetermined percentage of the voltage applied to the non-inverting input terminal.

8. A monitoring system for controlling the operation of a telephone answering system, said monitoring system responding to direct current voltage differentials on the telephone line independent of the actual direct current voltage level of the telephone line, said monitoring system including in combination: input circuitry connected to the telephone line, and output circuitry connected to said input circuitry and responsive to said direct current voltage differentials on said telephone line occurring after the telephone answering system has been activated by a ring signal received over the telephone line to produce an output signal when said voltage differentials exceed a predetermined minimum value so as to cause the telephone answering system to return to its original condition before the receipt of the ring signal.

9. The combination defined in claim 8, in which said output circuitry includes a comparator having an inverting input terminal and a non-inverting input terminal, said non-inverting input terminal being connected to the output of said input circuit, and self-biasing circuitry connected to the inverting input terminal to bias said inverting input terminal to a predetermined percentage of the voltage applied to the non-inverting input terminal.

10. The combination defined in claim 8, in which said input circuitry comprises an input attenuator amplifier circuit having a gain of less than unity for producing an output voltage which is a fraction of the voltage of the telephone line; and an absolute value amplifier circuit having a gain greater than unity connected to the output of said attenuator amplifier circuit for producing a single polarity output in response to outputs from said attenuator amplifier circuit of positive or negative polarities.

11. The combination defined in claim 10, in which said input attenuator amplifier circuit includes high impedance elements directly connecting the system to the telephone line.

12. The combination defined in claim 8, in which said output circuitry includes time delay means to cause said output circuitry to produce said output signal only when the voltage differentials exceed a predetermined minimum time interval.

* * * * *

REEXAMINATION CERTIFICATE (624th)
United States Patent
Hanscom

[11] B1 4,451,707
[45] Certificate Issued Jan. 20, 1987

[54] RING DETECTOR AND TELEPHONE LINE MONITORING SYSTEM FOR TELEPHONE ANSWERING INSTRUMENT

[75] Inventor: Bradford E. Hanscom, Downey, Calif.

[73] Assignee: Fortel Corp., Compton, Calif.

Reexamination Request:
No. 90/000,954, Feb. 7, 1986

Reexamination Certificate for:
Patent No.: 4,451,707
Issued: May 29, 1984
Appl. No.: 517,005
Filed: Jul. 25, 1983

Related U.S. Application Data

[63] Continuation-in-part of Ser. No. 381,185, May 24, 1982, abandoned.

[51] Int. Cl.[4] .......................................... H04M 1/64
[52] U.S. Cl. ............................. 179/84 R; 179/6.15; 179/6.16
[58] Field of Search .............. 179/81 R, 84 R, 84 A, 179/6.15, 6.16, 84 L, 84 T, 2 C, 2 A, 2 AM, 16 AA, 18 FA; 381/58–60

[56] References Cited
U.S. PATENT DOCUMENTS
3,692,983  9/1972  Cucciati et al. .
3,935,390  1/1976  Winterhalter ........................ 179/6 R

OTHER PUBLICATIONS

Master Op–Amp Applications Handbook, H. W. Fox, 1978, Preface.
Handbook of Operational Amplifier Circuit Design, D. F. Stout, 1976, Preface.
EDN with EEE, "Operational amplifier makes a simple delayed pulse generator", D. T. Anderson, vol. 17, No. 13, Jul. 72, p. 55.
Applications of Operational Amplifiers, J. G. Graeme, 1973, pp. 11, 20, 121.
Designing With Operational Amplifiers, J. G. Graeme, 1977, p. 136.
Electronic Design, "IC Op Amps Have Evolved", W. G. Jung, vol. 26, No. 1, 1-4-1978, pp. 94–101.

Primary Examiner—James L. Dwyer

[57] ABSTRACT

A circuit and system is provided in a telephone answering system and which monitors direct current voltage levels on the telephone line to distinguish between valid ring signals and dial pulses so that the telephone answering system will not attempt to answer when a local telephone is being dialed for an outgoing call. The circuit and system of the invention also responds to direct current voltage differentials on the telephone line, independent of the actual direct current voltage level, to cause the telephone answering system to return immediately to its automatic answer position in the event the calling party hangs up, or in the event the called party picks up, during the announcement interval (T1), or during the message recording interval (T2). This latter feature permits the telephone answering system immediately to return to its original condition in the presence of either of the two foregoing events, without wasting magnetic tape on blank messages, and without the calling party having to wait until the system goes through its entire (T1) and/or (T2) cycles in the event the called party picks up after the telephone answering instrument has answered a call.

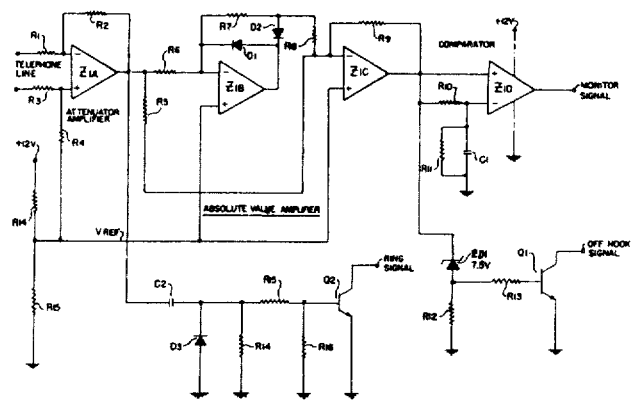

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

Claim 9 is cancelled.

Claim 8 is determined to be patentable as amended.

Claims 10–12, dependent on an amended claim, are determined to be patentable.

8. A monitoring system for controlling the operation of a telephone answering system, said monitoring system responding to direct current voltage differentials on the telephone line independent of the actual direct current voltage level of the telephone line, said monitoring system including in combination: input circuitry connected to the telephone line, *said input circuitry including circuit means for producing an output voltage representative of the actual direct current voltage level of the telephone line*, and output circuitry connected to said input circuitry [and], *said output circuitry including a comparator having a first input terminal connected to the output of said input circuitry and having a second input terminal, and self-biasing circuitry connected to the second input terminal of said comparator to bias said second input terminal to a voltage representing a predetermined percentage of the voltage applied to said first input terminal, said system being* responsive to said direct current voltage differentials on said telephone line occurring after the telephone answering system has been activated by a ring signal received over the telephone line to produce an output signal when said *direct current* voltage differentials exceed a predetermined minimum value so as to cause the telephone answering system to return to [its original] *the* condition *it was in* before the receipt of the ring signal.

* * * * *